United States Patent
Rivolta et al.

(10) Patent No.: US 12,032,747 B1
(45) Date of Patent: Jul. 9, 2024

(54) INFRARED BASED DIMMING GESTURE DETECTION

(71) Applicant: STMicroelectronics International N.V., Geneva (CH)

(72) Inventors: Stefano Paolo Rivolta, Desio (IT); Roberto Mura, Milan (IT); Edoardo Nagali, Milan (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/167,500

(22) Filed: Feb. 10, 2023

(51) Int. Cl.
*G06F 3/01* (2006.01)
*G01V 8/00* (2006.01)

(52) U.S. Cl.
CPC .............. *G06F 3/017* (2013.01); *G01V 8/005* (2013.01)

(58) Field of Classification Search
CPC .................................. G06F 3/017; G01V 8/005
See application file for complete search history.

(56) References Cited

U.S. PATENT DOCUMENTS

| | | | | |
|---|---|---|---|---|
| 7,804,422 B2* | 9/2010 | Liu | ........... | H05B 47/115 315/129 |
| 8,363,894 B2* | 1/2013 | Gerber | ........... | G06V 40/28 382/103 |
| 8,416,217 B1* | 4/2013 | Eriksson | ........... | G06F 1/1616 178/18.09 |
| 8,507,863 B2* | 8/2013 | Holenarsipur | ........... | G01S 7/4811 250/338.1 |
| 9,839,099 B2* | 12/2017 | Lark, Jr. | ........... | H01H 9/181 |
| 10,320,384 B2* | 6/2019 | Lohbihler | ........... | G08C 17/02 |
| 11,362,657 B2 | 7/2022 | Lohbihler et al. | | |
| 2006/0244067 A1* | 11/2006 | Socher | ........... | H01L 27/14669 257/350 |
| 2013/0214166 A1* | 8/2013 | Barlow | ........... | G01S 11/12 250/342 |
| 2015/0139483 A1* | 5/2015 | Shen | ........... | G10L 15/22 382/103 |
| 2015/0156850 A1* | 6/2015 | Chen | ........... | H03K 17/133 307/130 |
| 2015/0268025 A1* | 9/2015 | Huang | ........... | G06F 3/0346 702/150 |
| 2015/0285623 A1* | 10/2015 | Tachibana | ........... | G01S 7/497 250/341.8 |
| 2017/0116455 A1* | 4/2017 | Alameh | ........... | G06V 40/13 |
| 2020/0350911 A1* | 11/2020 | Lohbihler | ........... | H05B 45/10 |
| 2023/0146883 A1* | 5/2023 | Huang | ........... | G06F 3/017 715/863 |

FOREIGN PATENT DOCUMENTS

WO 2018024532 A1 2/2018

* cited by examiner

*Primary Examiner* — Grant Sitta
(74) *Attorney, Agent, or Firm* — SEED IP LAW GROUP LLP

(57) ABSTRACT

The present disclosure is directed to devices and methods for detecting dimming gestures using infrared detection. Infrared signals are detected using a thermal metal-oxide-semiconductor (TMOS) infrared (IR) sensor solution. The TMOS IR sensor is highly accurate and has low power consumptions compared to traditional IR sensors that utilize IR receivers.

14 Claims, 3 Drawing Sheets

INFRARED BASED DIMMING GESTURE DETECTION

BACKGROUND

Technical Field

The present disclosure is directed to devices and methods for detecting dimming gestures.

Description of the Related Art

Dimming devices are used to adjust an output or a setting of a device, and may be used in a variety of different applications. In contrast to devices with simply an on and off state, dimming devices allow a plurality of states that are between an on and off state. For example, dimming devices are often used for audio devices to adjust from low to high volumes of sound, or to act as an equalizer to adjust between different frequencies of sound. Dimming devices are also used for home devices to, for example, control the light intensity and color of lighting devices, and to open, partially open, and close shutters for windows. In devices including a display, such as a personal computer, dimming devices may be used to zoom in and zoom out of content shown on the display.

Dimming devices are commonly implemented with physical control components, such as touch panels, switches, and buttons, where a user physically touches the control component. However, these types of physical control components often suffer from mechanical stress. Further, most physical control components do not include any programmable logic or multi-target logic.

More recently, video-processed gesture recognition and proximity sensors have been used for dimming devices to overcome the drawbacks of physical control components. Unfortunately, video-processed gesture recognition consumes large amounts of processing and power resources, and proximity sensors have low resolution and sensitivity.

BRIEF SUMMARY

The present disclosure is directed to devices and methods for detecting dimming gestures using infrared detection. Infrared signals are detected using a thermal metal-oxide-semiconductor (TMOS) infrared (IR) sensor solution. The TMOS IR sensor is highly accurate and has low power consumption compared to traditional IR sensors that utilize IR receivers.

In various embodiments, a dimming operation is performed based on IR signals measured by the TMOS IR sensor. For example, in the dimming operation, an output or a setting of a device is adjusted based on an intensity or an amplitude of a measured IR signal.

The dimming operation is also initiated and halted based on IR signals measured by the TMOS IR sensor. For example, a dimming operation is initiated in response to a differential calculation of a measured IR signal being greater than a threshold value, and halted in response to a standard deviation calculation of a measured IR signal being less than a threshold value.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known processing techniques and structures and methods of manufacturing of electronic devices and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

It is noted that the dimensions set forth herein are provided as examples. Other dimensions are envisioned for this embodiment and all other embodiments of this application.

As discussed above, dimming devices may be implemented with a variety of different techniques, such as physical control components, video-processed gesture recognition, and proximity sensors. However, many of these current techniques suffer from mechanical stress, are unable to have programmable logic or multi-target logic, have high resource consumption, or have low resolution and sensitivity.

Figure 1:
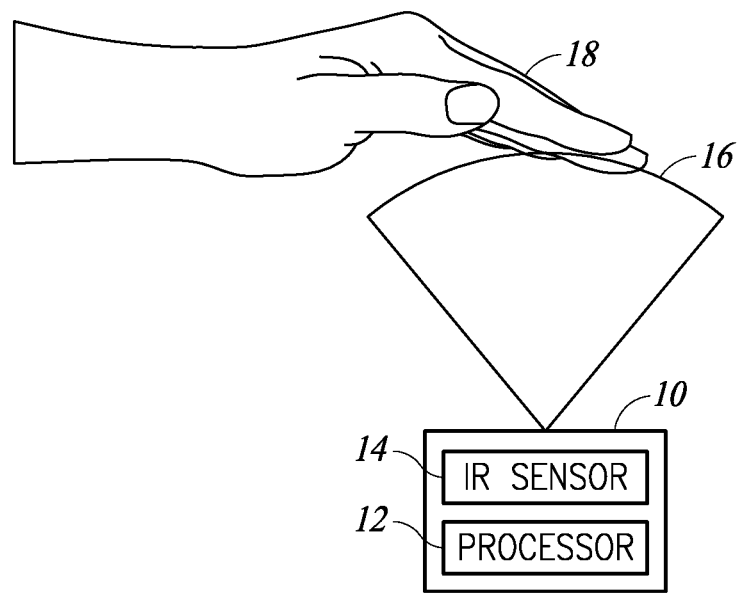
FIG. 1 is a device according to an embodiment disclosed herein.
Figure 2:
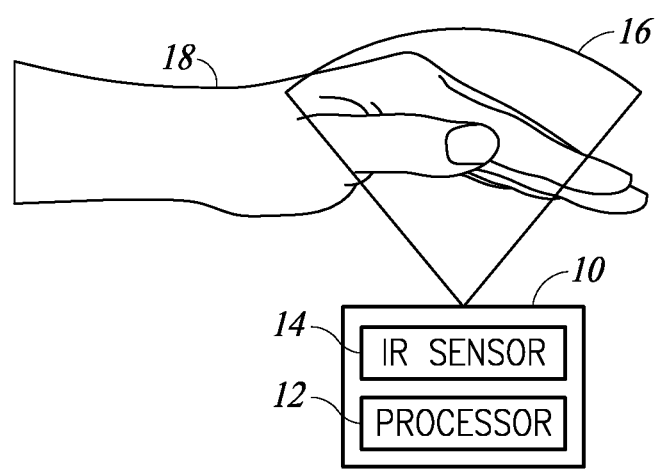
FIG. 2 is the device shown in FIG. 1 according to an embodiment disclosed herein.

The present disclosure is directed to devices and methods for detecting dimming gestures based on infrared detection. FIGS. 1 and 2 show a device 10 according to an embodiment disclosed herein. It is beneficial to review FIGS. 1 and 2 together.

The device 10 is a dimming device that is configured to adjust an output or a setting of the device 10. In contrast to devices with simply an on and off state, the device 10 is able to set a plurality of states (e.g., low level, medium level, high level, and various levels in between) that are between an on and off state. Stated differently, the device 10 is able to set numerous levels of output as opposed to a set number of discrete outputs. For example, the device 10 may be an audio device (e.g., a music player, a mobile device, etc.) to adjust from low to high volumes of sound, or to act as an equalizer to adjust certain frequencies of sound. The device 10 may also be a home device to control the light intensity and color of lighting devices, and to open, partially open, and close shutters for windows. Further, the device 10 may be a device including a user interface on a display to control the dimensions of objects shown on the user interface for zooming in and out. Other types of devices are also possible. The device 10 includes a processor 12 and an infrared (IR) sensor 14.

The processor 12 is electrically coupled to the IR sensor 14. The processor 12 executes programs and processes data generated by the IR sensor 14. In one embodiment, the processor 12 is the main processor of the device 10 that handles various functions of the device 10. In one embodiment, the processor 12 is included within IR sensor 14 such that the IR sensor 14, itself, is able to execute programs and process its own data. In this case, the device may include another processor to handle the various other functions of the device 10. The processor 12 may be any type of general processor, controller, signal processor, or any other type of device configured to process data.

The IR sensor 14 is electrically coupled to the processor 12. The IR sensor 14 is a thermal metal-oxide-semiconductor (TMOS) IR sensor solution configured to detect human presence and movement.

The TMOS is sensitive to and detects IR radiation emitted by objects, such as a user's hand, in its field of view (FoV) 16. In contrast to some proximity sensors, the IR sensor 14 does not emit IR light with an emitter and detect reflected IR light with a photo detector. Rather, when a user, for example, moves his or her hand in the FoV 16, the IR sensor 14 detects the IR light emitted by the user's hand, and generates a sensor signal indicating the amount of IR light received by the IR sensor 14. The sensor signal is proportional to the amount of IR light detected by the IR sensor 14. Generally, the IR sensor 14 generates a signal that is proportional to the IR radiation generated by objects in the FoV 16. If one of these objects has a temperature higher than the temperatures of the other objects is moved closer to the IR sensor 14, the IR sensor 14 generates a higher signal. Conversely, if one of these objects has a temperature lower than the temperatures of the other objects is moved closer to the IR sensor 14, the IR sensor 14 generates a lower signal.

In FIG. 1, a user's hand 18 is far from the IR sensor 14, inside the FoV 16. As a result, the IR sensor 14 will detect a minimal amount of IR, and generate a sensor signal with a first magnitude. In contrast, in FIG. 2, the user's hand 18 is close to the IR sensor 14, inside the FoV 16. As a result, the IR sensor 14 will detect a substantial amount of IR, and generate a sensor signal with a second magnitude larger than the first magnitude. The user's hand 18 is considered to be at a higher temperature than the temperature of other objects in the FoV 16, which are not shown for simplicity.

Figure 3:
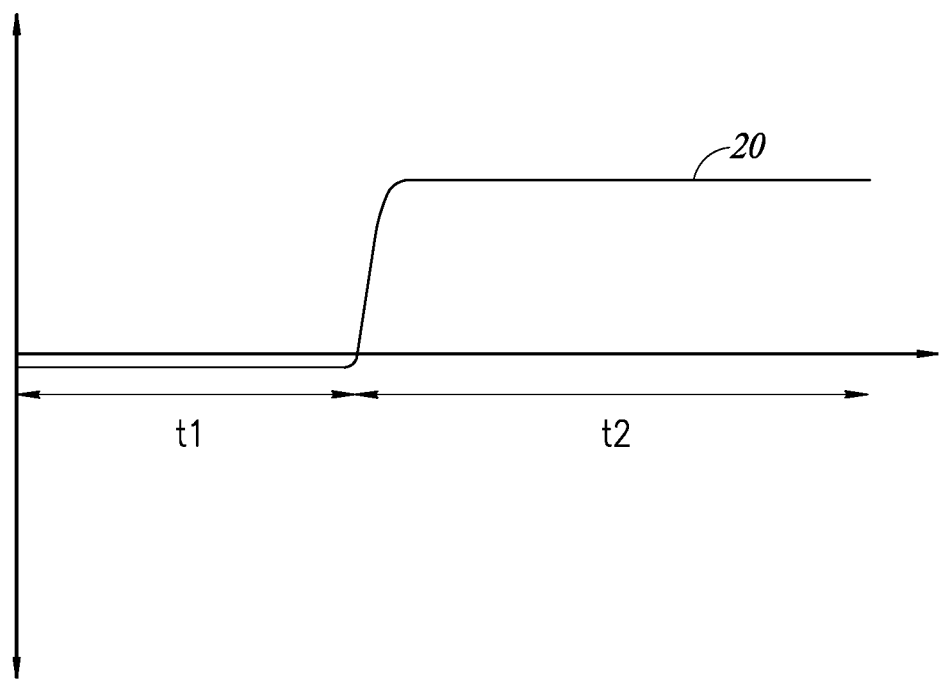
FIG. 3 is a sensor signal generated by an infrared sensor according to an embodiment disclosed herein.

For example, FIG. 3 is a sensor signal 20 generated by the IR sensor 14 according to an embodiment disclosed herein. The horizontal axis is a time axis, and the vertical axis is an amplitude axis. The axes may have any type of unit. For example, the time axis may be in seconds or a number of samples; and the amplitude axis may be in volts, amps, or an analog-to-digital (ADC) output. The sensor signal 20 indicates the strength of the IR signal detected by the IR sensor 14.

During time t1, the user's hand 18 is far from the IR sensor 14 as shown in FIG. 1. As such, the sensor signal 20 has a low amplitude during time t1. Conversely, during time t2, the user's hand 18 is close to the IR sensor 14 as shown in FIG. 2. As such, the sensor signal 20 has a large amplitude during time t2.

Figure 4:
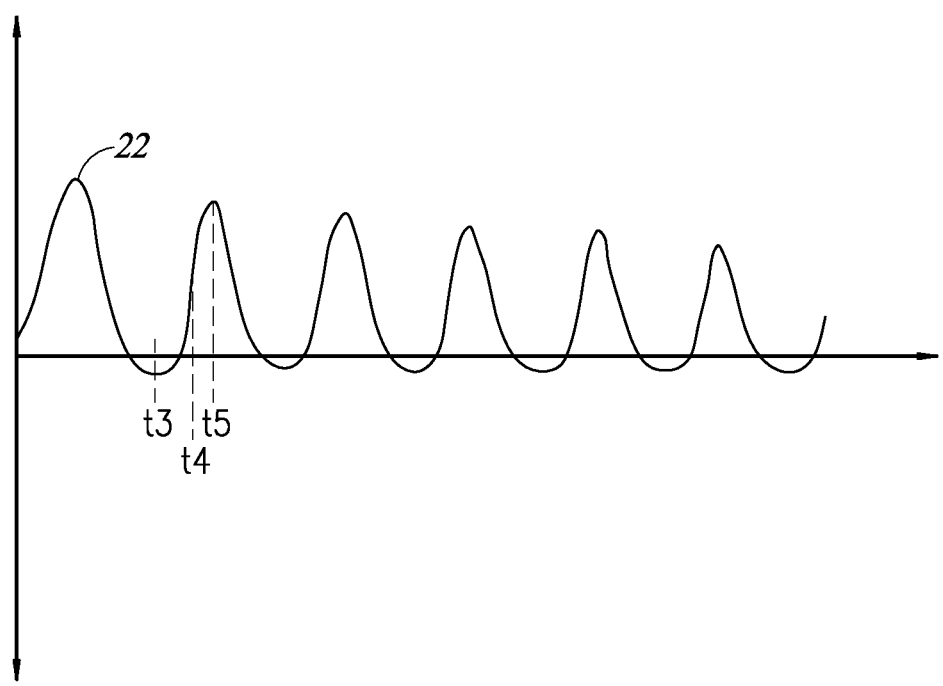
FIG. 4 is a sensor signal generated by an infrared sensor according to an embodiment disclosed herein.

As another example, FIG. 4 is a sensor signal 22 generated by the IR sensor 14 according to an embodiment disclosed herein. Similar to FIG. 4, the horizontal axis is a time axis, and the vertical axis is an amplitude axis. The sensor signal 22 indicates the strength of the IR signal detected by the IR sensor 14.

In the example shown in FIG. 4, the user's hand 18 is moved close to and away from the IR sensor 14, inside the FoV 16. As a result, the sensor signal 22 modulates between low and high amplitude values.

The device 10, more specifically the processor 12, adjusts an output or a setting of the device 10 based on intensity or amplitude of the sensor signal generated by the IR sensor 14. For example, referring to FIG. 4 and in a case where the device 10 is an audio device, the device 10 sets a low volume of sound in response to time t3 in which the sensor signal 22 has a low amplitude value, a medium volume of sound in response to time t4 in which the sensor signal 22 has a medium amplitude value, and a high volume of sound in response to time t5 in which the sensor signal 22 has a high amplitude value. Adjustment of the output of the device 10 will be discussed in further detail below.

The IR sensor 14 is fabricated using, for example, a complementary metal-oxide semiconductor silicon on insulator (CMOS SOI) process. For example, a TMOS transistor is fabricated in an integrated circuit die including a material that is transparent to IR light. As such, IR light is able to pass through the die to the TMOS transistor, and is absorbed by the TMOS transistor.

The transconductance of the TMOS transistor is highly sensitive to temperature. IR light absorbed by the TMOS transistor results in changes in temperature in the TMOS transistor, which in turn, results in changes in the transconductance of the transistor. The IR sensor 14 generates and outputs sensor signals based on electrical signals (e.g., voltage and current signals) of the TMOS transistor that are proportional to the amount of IR light absorbed by the TMOS transistor.

The IR sensor 14 is highly accurate and has low power consumptions compared to traditional IR sensors that utilize IR receivers (e.g., photo detectors, photo diodes, etc.). In one embodiment, the TMOS transistor of the IR sensor 14 is operated in a sub threshold region to reduce power consumption even further. In addition, the IR sensor 14 permits cost reduction because high cost optical components, such as Fresnel lenses, are unnecessary.

In one embodiment, the IR sensor 14 includes signal processing circuitry that generates digital sensor data from analog sensor signals. The sensor signals discussed herein may correspond to the raw analog signals output in conjunction with the TMOS transistor. The sensor signals may also correspond to digital sensor data that results from signal processing of the analog sensor signals. The signal processing circuitry may be part of the same integrated circuit die in which the IR sensor 14 is implemented.

In one embodiment, as shown in FIGS. 1 and 2, the device 10 is oriented and positioned such that the FoV 16 of the IR sensor 14 faces upwards (i.e., the FoV 16 is directly above the IR sensor 14) in order to minimize false detections of a dimming operation. False detections may be caused by an object that emits IR radiation, such as a person (considered to be at a higher temperature than the temperature of other objects in the FoV 16), quickly passing through the FoV 16 not intending to utilize the device 10. False detections will be discussed in further detail below.

Figure 5:
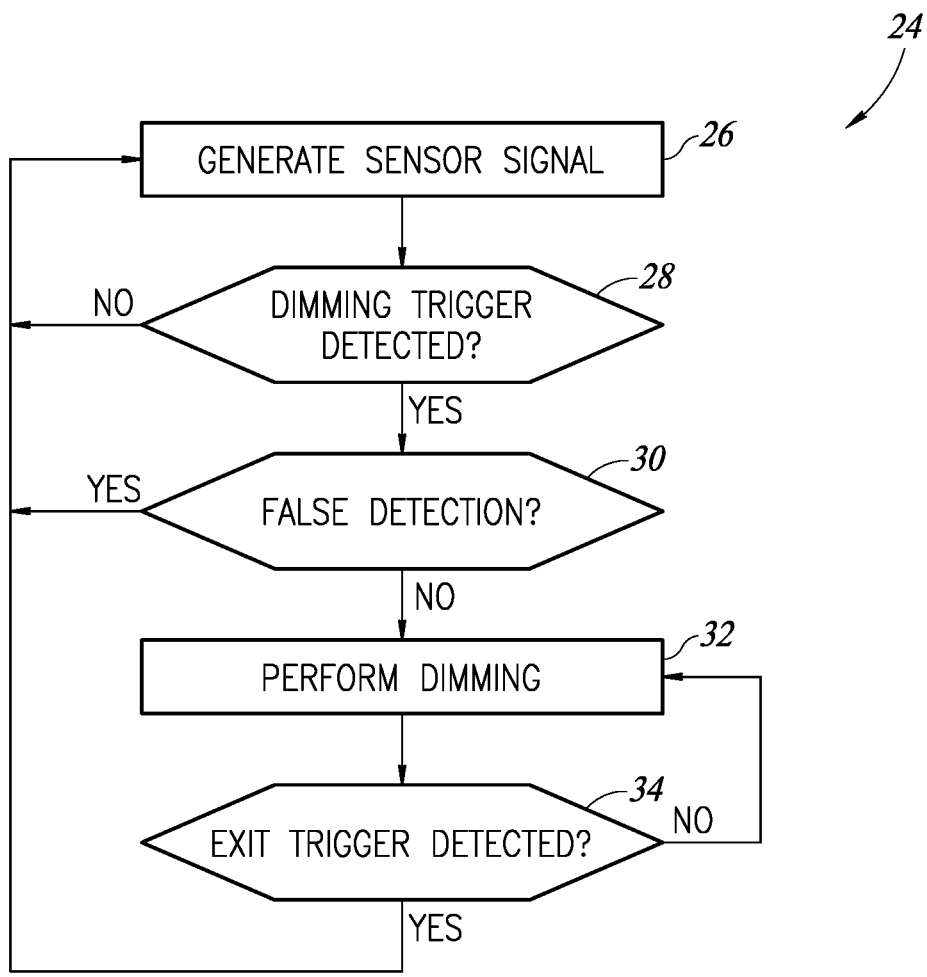
FIG. 5 is a method for dimming gesture detection according to an embodiment disclosed herein.

FIG. 5 is a method 24 for dimming gesture detection according to an embodiment disclosed herein.

In block 26, the IR sensor 14 measures and generates a sensor signal. As discussed above, the sensor signal is proportional to the amount of IR light detected by the IR sensor 14. Generally, referring to FIGS. 1 and 2, an object that emits IR radiation, such as a user's hand (considered to be at a higher temperature than the temperature of other objects in the FoV 16), that covers a large area of the FoV 16 generates a large amount of IR, and results in a high sensor signal. Conversely, an object that emits IR radiation, such as a user's hand (considered to be at a higher temperature than the temperature of other objects in the FoV 16), that covers a small area of the FoV 16 generates a small amount of IR, and results in a low sensor signal. The method 24 then moves to block 28. It is noted that the IR sensor 14 continues to measure and generate the sensor signal throughout the method 24.

In block 28, the processor 12 receives the sensor signal, and determines whether a dimming trigger has occurred. The dimming trigger initiates a dimming operation, which will be discussed in further detail below.

The dimming trigger is detected based on the sensor signal generated in block 26. In one embodiment, the dimming trigger is detected in response to determining the amplitude of the sensor signal is greater than a determined first threshold value, as this indicates that an object emitting IR radiation (considered to be at a higher temperature than the temperature of other objects in the FoV 16), is in the FoV 16 or it is moved closer to the IR sensor 14.

The dimming trigger may also be detected in response to determining a characteristic or parameter of the sensor signal is greater than the first threshold value. The characteristic of the sensor signal may include a derivative calculation (e.g., a rate of change of the sensor signal), a differential calculation (e.g., a difference of the sensor signal from a determined value), a standard deviation calculation, an energy calculation (e.g., a total energy of the sensor signal in a period of time), a variance calculation (e.g., a variance of the sensor signal in a period of time), a zero crossing calculation (e.g., a number of times the sensor signal crosses zero in a period of time), a mean crossing calculation (e.g., a number of times the sensor signal crosses its average value in a period of time), a peak-to-peak calculation (e.g., a difference between the maximum amplitude and the minimum amplitude of the sensor signal in a period of time), a peak count calculation (e.g., a total number of peaks in the sensor signal in a period of time), an absolute mean calculation (e.g., an absolute mean of the sensor signal in a period of time), a maximum calculation (e.g., a maximum of the sensor signal in a period of time), or a minimum calculation (e.g., a minimum of the sensor signal in a period of time). In one embodiment, the characteristic is a differential calculation. Other types of calculations are also possible.

If the processor 12 does not detect a dimming trigger, the method 24 returns to block 26, where the IR sensor 14 continues to measure infrared signals and generate the sensor signal. If the processor 12 detects a dimming trigger, the method 24 moves to block 30.

In block 30, false detections of dimming triggers are detected. Stated differently, the processor 12 determines whether the dimming trigger detected in block 28 was incorrectly detected. False detections may be caused by an object that emits IR radiation, such as a person considered to be at a higher temperature than the temperature of other objects in the FoV 16), quickly passing through the FoV 16 not intending to utilize the device 10. A false detection is detected based on the sensor signal.

In one embodiment, a false detection is detected in response to determining the amplitude of the sensor signal is less than a determined second threshold value, as this indicates the object has subsequently moved out of the FoV 16 after the trigger detection in block 28. In one embodiment, the second threshold value is less than the first threshold value used in block 28. The false detection may also be detected in response to determining a characteristic of the sensor signal is less than the second threshold value. In one embodiment, the characteristic is a differential calculation. Examples of different characteristics are discussed above.

In one embodiment, a false detection is detected in response to determining the amplitude of the sensor signal is greater than a determined third threshold value, as this indicates the object has subsequently become erratic after the trigger detection in block 28. In one embodiment, the third threshold value is greater than the first threshold value used in block 28. The false detection may also be detected in response to determining a characteristic of the sensor signal is greater than the third threshold value. In one embodiment, the third threshold value is less than the first threshold value used in block 28, and the characteristic is a differential calculation. Examples of different characteristics are discussed above.

In one embodiment, the processor 12 determines the dimming trigger detected in block 28 was correctly detected (i.e., the dimming trigger is confirmed) in response to determining the amplitude of the sensor signal is less than a determined fourth threshold value for a first determined amount of time, as this indicates the object is steady (e.g., stationary) after the trigger detection in block 28. The dimming trigger may also be confirmed in response to determining a characteristic of the sensor signal is less than the fourth threshold value for the first determined amount of time. In one embodiment, the fourth threshold value is lower than the first threshold value used in block 28, and the characteristic is a differential calculation. Examples of different characteristics are discussed above.

If the processor 12 detects a false detection, the method 24 returns to block 26, where the IR sensor 14 continues to measure infrared signals and generate the sensor signal. If the processor 12 does not detect a false detection and confirms the dimming trigger detected in block 28 (i.e., the dimming trigger detected in block 28 is accurate), the method 24 moves to block 32.

In block 32, the processor 12 performs a dimming operation based on the sensor signal. In the dimming operation, the processor 12 adjusts an intensity (e.g., amplitude) of an output or a setting of the device 10 based on an intensity (e.g., amplitude) of the sensor signal generated by the IR sensor 14. The intensity of the output or setting of the device 10 is proportional to the intensity of the sensor signal.

As an example, in a case where the device 10 is an audio device, the device 10 sets a volume of an audio signal proportional to the intensity of the sensor signal (e.g., a low volume of sound is set in response to the sensor signal having a low amplitude value, a medium volume of sound is set in response to the sensor signal having a medium amplitude value, a high volume of sound is set in response to the sensor signal having a high amplitude value).

As another example, in a case where the device 10 is a lighting device, the device 10 sets a light intensity proportional to the intensity of the sensor signal (e.g., a low light intensity is set in response to the sensor signal having a low amplitude value, a medium light intensity is set in response to the sensor signal having a medium amplitude value, a high light intensity is set in response to the sensor signal having a high amplitude value).

Similarly, in a case where the device 10 is a window shutter device, the device 10 sets an open state of the window shutter device proportional to the intensity of the sensor signal (e.g., the window shutter device is closed in response to the sensor signal having a low amplitude value, the window shutter device is partially opened in response to the sensor signal having a medium amplitude value, the window shutter device is fully opened in response to the sensor signal having a high amplitude value).

In addition, in a case where the device 10 is a device including a user interface on a display (e.g., a personal computer), the device 10 sets dimensions of an object shown on the user interface proportional to the intensity of the sensor signal (e.g., the object is set to have small dimensions in response to the sensor signal having a low amplitude value, the object is set to have medium dimensions in response to the sensor signal having a medium amplitude value, the object is set to have large dimensions in response to the sensor signal having a high amplitude value) to create a zooming in and out effect.

The method then moves to block 34. The dimming operation in block 32 is continued to be performed during block 34.

In block 34, the processor 12 determines whether an exit trigger has occurred. An exit trigger stops the dimming operation performed in block 32. The exit trigger is detected based on the sensor signal.

In one embodiment, in a case where the sensor signal is without a DC component, the processor 12 determines the exit trigger has not occurred and continues the dimming operation of block 32 in response to determining a characteristic of the sensor signal is greater than a determined fifth threshold value, as this indicates the object is still being moved in the FoV 16. In one embodiment, the characteristic is a standard deviation calculation. In one embodiment, the characteristic is an absolute differential calculation. Examples of different characteristics are discussed above.

In one embodiment, in a case where the sensor signal is without a DC component, the processor 12 determines the exit trigger has occurred and stops the dimming operation of block 32 in response to determining a characteristic of the sensor signal is less than a determined sixth threshold value for a second determined amount of time, as this indicates the object is steady (e.g., stationary). In one embodiment, the sixth threshold value is equal to the fifth threshold value. In one embodiment, the second determined amount of time is less than the first determined amount of time in block 30. In one embodiment, the characteristic is a standard deviation calculation. In one embodiment, the characteristic is an absolute differential calculation. Examples of different characteristics are discussed above.

If the processor 12 does not detect an exit trigger, the method 24 returns to block 32, where the dimming operation continues to be performed. If the processor 12 detects an exit trigger, the method 24 returns to block 26, where the IR sensor 14 continues to measure infrared signals and generate the sensor signal.

The various embodiment disclosed herein provide devices and methods for detecting dimming gestures using infrared detection. Infrared signals are detected using a TMOS IR sensor solution. The TMOS IR sensor is highly accurate and has low power consumptions compared to traditional IR sensors that utilize IR receivers.

A device may be summarized as including: an infrared (IR) sensor having a field of view, the IR sensor configured to measure IR light emitted by an object in the field of view, and generate a sensor signal proportional to the measured IR light; and a processor configured to perform a dimming operation based on the sensor signal, the dimming operation proportionally adjusts an intensity of an output of the device based on the sensor signal.

The IR sensor may be thermal metal-oxide-semiconductor IR sensor, and the field of view may be positioned above the IR sensor.

The dimming operation may proportionally adjusts a dimension of an object on a display based on the sensor signal.

The dimming operation may proportionally adjust volume of an audio signal based on the sensor signal.

The dimming operation may proportionally adjust a light intensity based on the sensor signal.

The processor may be configured to detect a dimming trigger based on a parameter of the sensor signal, and the dimming operation may be performed in response to the dimming trigger being detected.

The dimming trigger may be detected in response to the parameter being greater than a first threshold value, and the parameter may be a differential calculation of the sensor signal.

The dimming operation may be performed in response to the dimming trigger being detected and in response to the parameter being less than a second threshold value for a determined amount of time.

The processor may be configured to detect a false detection of the dimming trigger based on a parameter of the sensor signal.

The false detection may be detected in response to the parameter being less than a first threshold value or greater than a second threshold value, and the parameter may be a differential calculation of the sensor signal.

The dimming operation may be performed in response to the dimming trigger being detected and in response to the parameter being less than a third threshold value for a determined amount of time.

The processor may be configured to detect an exit trigger based on a parameter of the sensor signal, and the dimming operation may be stopped in response to the exit trigger being detected.

The exit trigger may be detected in response to the parameter being less than a first threshold value for a determined amount of time, and the parameter may be a standard deviation calculation of the sensor signal.

The dimming operation may continue to be performed in response to the parameter being greater than a second threshold value.

A method may be summarized as including: measuring, by an infrared (IR) sensor, IR light emitted by an object in a field of view of the IR sensor; generating, by the IR sensor, a sensor signal that is proportional to measured IR light; and performing, by a device including the IR sensor, a dimming operation based on the sensor signal, the dimming operation proportionally adjusts an intensity of an output of the device based on the sensor signal.

The IR sensor may be thermal metal-oxide-semiconductor IR sensor.

The method may further include: detecting a dimming trigger based on the sensor signal, the dimming operation being performed in response to the dimming trigger being detected; and detecting a false detection of the dimming trigger based on the sensor signal.

The method may further include: detecting an exit trigger based on the sensor signal, the dimming operation being stopped in response to the exit trigger being detected.

A device may be summarized as including: a thermal metal-oxide-semiconductor (TMOS) infrared (IR) sensor configured to measure IR light emitted by an object, and generate a sensor signal proportional to the measured IR light; and a processor configured to: detect a dimming trigger based on the sensor signal; and adjust, in response to the dimming trigger being detected, an intensity of an output of the device based on the sensor signal.

The processor may be configured to: detect, in response to the intensity being adjusted, an exit trigger based on the sensor signal; and stop, in response to the exit trigger being detected, adjustment of the intensity of the output of the device.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an infrared (IR) sensor having a field of view, the IR sensor configured to measure IR light emitted by an object in the field of view, and generate a sensor signal proportional to the measured IR light; and
a processor configured to:
detect a dimming trigger in response to a first differential calculation of the sensor signal being greater than a first threshold value;
detect a false detection of the dimming trigger in response to a second differential calculation of the sensor signal being less than a second threshold value smaller than the first threshold value or being greater than a third threshold value larger than the first threshold value;
perform a dimming operation based on the sensor signal in case the dimming trigger is detected and the false detection is undetected, the dimming operation proportionally adjusts an intensity of an output of the device based on the sensor signal.

2. The device of claim 1 wherein the IR sensor is a thermal metal-oxide-semiconductor IR sensor, and the field of view is positioned above the IR sensor.

3. The device of claim 1 wherein the dimming operation proportionally adjusts a dimension of a size of an object on a display based on the sensor signal.

4. The device of claim 1 wherein the dimming operation proportionally adjusts volume of an audio signal based on the sensor signal.

5. The device of claim 1 wherein the dimming operation proportionally adjusts a light intensity based on the sensor signal.

6. The device of claim 1 wherein
the dimming operation is performed in response to a parameter of the sensor signal being less than a fourth threshold value for a determined amount of time.

7. The device of claim 1 wherein
the processor is configured to detect an exit trigger based on a parameter of the sensor signal, and
the dimming operation is stopped in response to the exit trigger being detected.

8. The device of claim 7 wherein
the exit trigger is detected in response to the parameter being less than a fourth threshold value for a determined amount of time, and
the parameter is a standard deviation calculation of the sensor signal.

9. The device of claim 8 wherein
the dimming operation continues to be performed in response to the parameter being greater than a fifth threshold value.

10. A method, comprising:
measuring, by an infrared (IR) sensor, IR light emitted by an object in a field of view of the IR sensor;
generating, by the IR sensor, a sensor signal that is proportional to measured IR light; and
detecting, by a device including the IR sensor, a dimming trigger in response to a first differential calculation of the sensor signal being greater than a first threshold value;
detecting, by the device, a false detection of the dimming trigger in response to a second differential calculation of the sensor signal being less than a second threshold value smaller than the first threshold value or being greater than a third threshold value larger than the first threshold value; and
performing, by the device, a dimming operation based on the sensor signal in case the dimming trigger is detected and the false detection is undetected, the dimming operation proportionally adjusts an intensity of an output of the device based on the sensor signal.

11. The method of claim 10 wherein the IR sensor is a thermal metal-oxide-semiconductor IR sensor.

12. The method of claim 10, further comprising:
detecting an exit trigger based on the sensor signal, the dimming operation being stopped in response to the exit trigger being detected.

13. A device, comprising:
a thermal metal-oxide-semiconductor (TMOS) infrared (IR) sensor configured to measure IR light emitted by an object, and generate a sensor signal proportional to the measured IR light; and
a processor configured to:
detect a dimming trigger in response to a first differential calculation of the sensor signal being greater than a first threshold value;
detect a false detection of the dimming trigger in response to a second differential calculation of the sensor signal being less than a second threshold value smaller than the first threshold value or being greater than a third threshold value larger than the first threshold value;
adjust, in case the dimming trigger is detected and the false detection is undetected, an intensity of an output of the device based on the sensor signal.

14. The device of claim 13 wherein the processor is configured to:
detect, in response to the intensity being adjusted, an exit trigger based on the sensor signal; and
stop, in response to the exit trigger being detected, adjustment of the intensity of the output of the device.

* * * * *